United States Patent [19]

Schumann et al.

[11] Patent Number: 5,016,841
[45] Date of Patent: May 21, 1991

[54] ROLLING CONDUCTOR SUPPORT

[75] Inventors: P. Richard Schumann, West Bend; Paul R. Schmidt, Burnett, both of Wis.

[73] Assignee: Gleason Reel Corp., Mayville, Wis.

[21] Appl. No.: 557,230

[22] Filed: Jul. 23, 1990

[51] Int. Cl.$^5$ .............................................. F16L 3/00
[52] U.S. Cl. ...................................... 248/51; 59/78.1; 248/49
[58] Field of Search .......................... 248/49, 51, 68.1; 59/78.1, 900; 137/355.16; 474/91

[56] References Cited

U.S. PATENT DOCUMENTS

| | | | |
|---|---|---|---|
| 3,546,875 | 12/1970 | Weber | 248/49 X |
| 3,782,670 | 1/1974 | Kielma | 248/68.1 X |
| 3,848,407 | 11/1974 | Moritz | 248/51 X |
| 3,948,041 | 4/1976 | Borjesson | 59/78.1 |
| 4,104,871 | 8/1978 | Moritz | 248/68.1 X |
| 4,392,344 | 7/1983 | Gordon | 248/68.1 X |
| 4,570,437 | 2/1986 | Moritz | 59/78.1 |
| 4,590,961 | 5/1986 | Schumann | 137/355.16 |
| 4,658,577 | 4/1987 | Klein | 59/78.1 |
| 4,672,805 | 6/1987 | Moritz | 248/49 X |
| 4,800,714 | 1/1989 | Moritz | 248/49 X |

FOREIGN PATENT DOCUMENTS 1225241 6/1960 France ....................... 248/68.1

Primary Examiner—J. Franklin Foss
Attorney, Agent, or Firm—Myers & Assoc., Ltd.

[57] ABSTRACT

The disclosed invention is a rolling conductor support for supporting a conductor between a stationary supply and a moving consumer or parts of machinery moving relative to each other. The rolling conductor support includes a plurality of chains. Each chain includes a number of follower links, lubricating members, control links, connecting pins and a planar toothed fasteners. Each follower link has three follower orifices at either end of the link and the follower orifices are substantially perpendicluar to a longitudinal axis of the follower link. The lubricating member is located between the follower link and the control link and includes lubricating orifices conformal with the follower orifices. The control link includes two arcuate control slots having a radius of curvature about a center where a control pivot orifice is located. The follower links are clevised about the lubricating members and the control links. The connecting pins connect the follower link, with the adjacent lubricating member, and the adjacent control link. Two of the connecting pins acts to delimit relative rotation between the adjacent follower and control links. The planar toothed fastener has three toothed orifices each of which receive a connecting pin to positively position the links and lubricating member. The connecting pins include a plurality of grooves near a distal end and a head at an opposite head end one of the connecting pin grooves receives the planar structure.

11 Claims, 3 Drawing Sheets

ROLLING CONDUCTOR SUPPORT

BACKGROUND OF THE INVENTION

This invention relates to the field of supporting flexible electric, hydraulic, pneumatic and the like conductors which extend between portions of machines that move relative to each other, or between a stationary supply and a moving consumer. In particular this invention relates to rolling conductor supports fabricated from one or more drag chains including adjacent links which rotate relative to each other through a delimited degree of relative rotation.

Rolling conductors supports have long been known in the art and a considerable number of patents and publications exist showing aspects of such supports. Among those patents are:

U.S. Pat. No. 4,311,293 issued to Tenniswood on Jan. 19, 1982 describing ROLLING CONDUCTOR SUPPORTS, is incorporated herein by reference, and is owned by the assignee of the present invention Gleason Reel Corp., Tenniswood includes a chain having follower and control links.

U.S. Pat. No. 3,566,603 issued to Chadwick on Mar. 2, 1971 describing CABLE DRAG CHAINS, a nylon disk between adjacent links rotating relative to each other.

Similarly patents and a publication exist which relate to components of the rolling conductor support of the present invention including:

Page 99 of a Waldes Kohinoor, Inc. (of New Jersey) catalog shows a circular push-on fastener including a toothed orifice. The teeth of which fastener being slanted from the general plane of the fastener to oppose movement of the fastener in one direction.

Page 44 of the Waldes Kohinoor, Inc. catalog shows an external retaining ring.

U.S. Pat. No. 2,783,674 issued to Becker on Mar. 5, 1957 describing a PAIR OF FLEXIBLY INTERCONNECTED SHEET METAL NUTS.

SUMMARY OF THE INVENTION

The present invention is a rolling conductor support for supporting a conductor between a stationary supply and a moving consumer or parts of machinery moving relative to each other. The rolling conductor support includes a plurality of chains. Each chain includes a number of follower links, lubricating members, control links, connecting pins and a planar toothed fasteners. Each follower link has at least two orifices at either end of the link and each pair of orifices is substantially perpendicular to a longitudinal axis of the follower link. The lubricating member is located between the follower link and the control link and includes lubricating orifices conformal with the follower orifices. The control link includes at least one arcuate control slot having a radius of curvature about a center. The connecting pins connect the follower link, with the adjacent lubricating member, and the adjacent control link. At least one of the connecting pins acts to delimit relative rotation between the adjacent follower and control links. The planar toothed fastener has at least two toothed orifices each of which receive a connecting pin to positively position the links and lubricating member. The connecting pin includes a plurality of grooves near at a distal end and a head at an opposite head end, and one of the connecting pin grooves receives the planar fastener.

DESCRIPTION OF THE DRAWINGS

Figure 1:
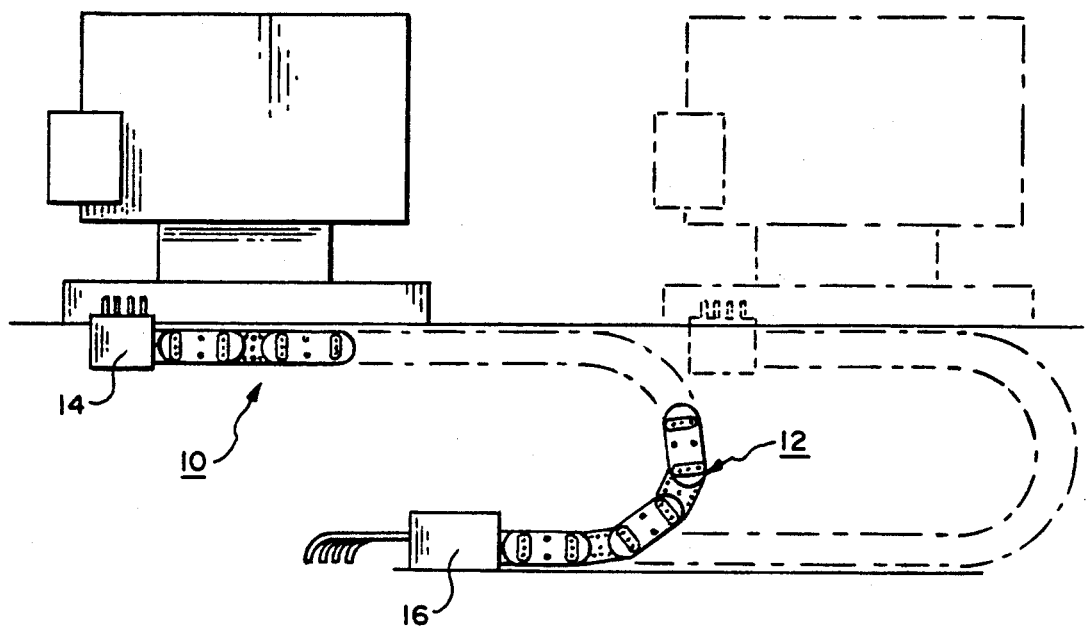
FIG. 1 shows a side elevation view of a rolling conductor support of the present invention illustrating the operation of the rolling conductor support with dashed lines.
Figure 2:
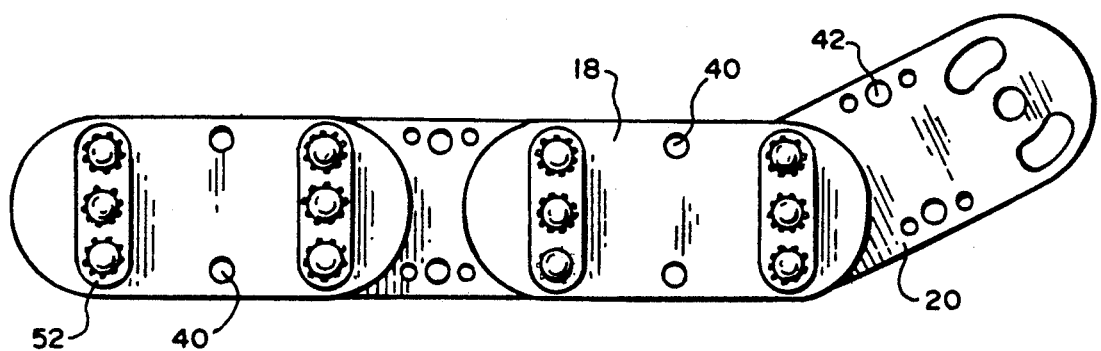
FIG. 2 is an illustration of a portion of the rolling conductor support of the present invention.
Figure 3:
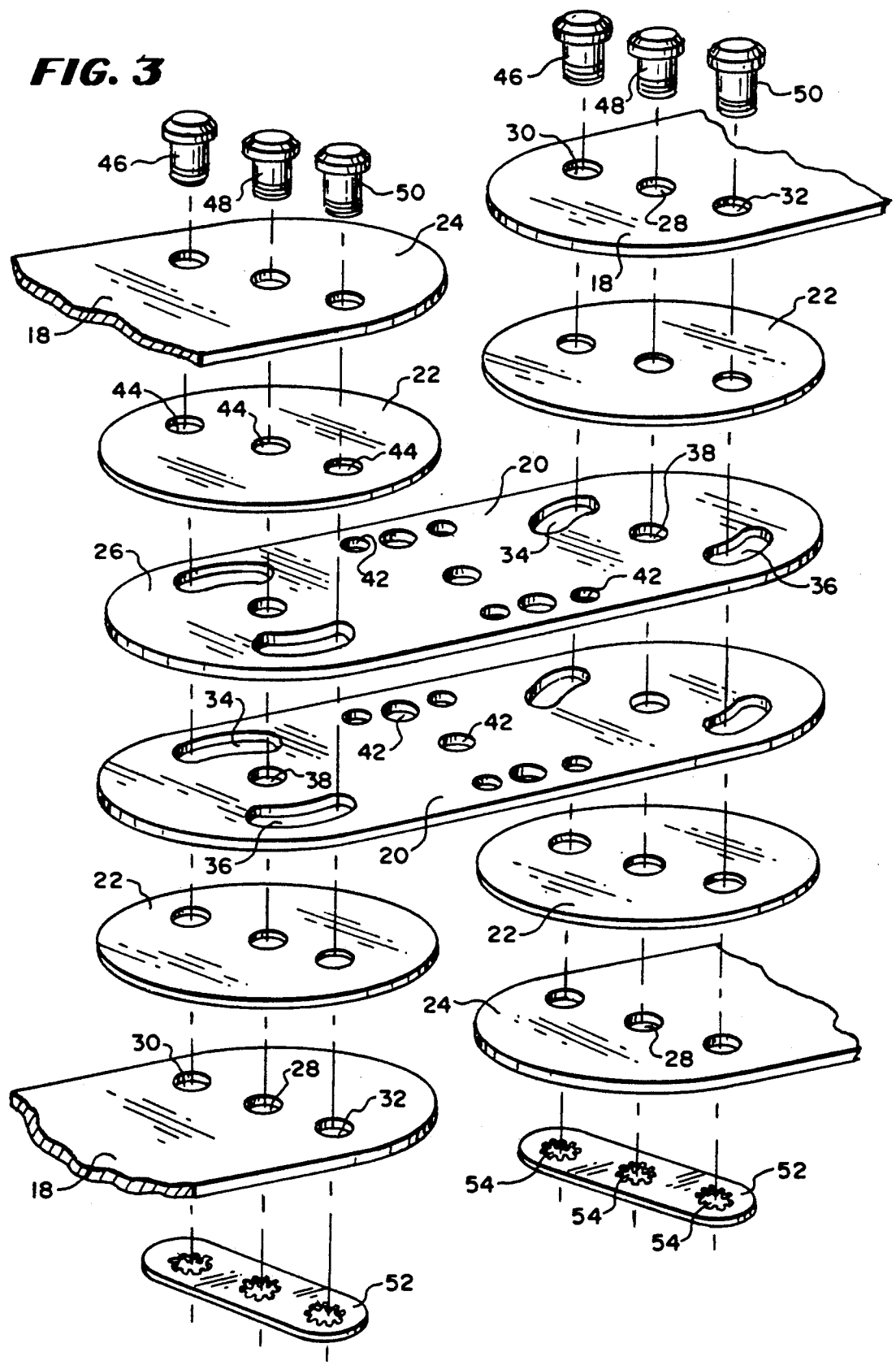
FIG. 3 is an exploded view of the invention showing major components of the rolling conductor support.

FIG. 1 is a side elevation view of a rolling conductor support 10 of the present invention showing a chain 12 at either end connected to a moving connection 14 and a stationary connection 16. Each chain 12 includes two distinct types of links as shown in FIGS. 2 and 3. Follower links 18 are joined to control links 20. A lubricating member 22 is interposed between adjacent follower ends 24 and control ends 26. Each link 18, 20 extends between respective ends 24, 26 along a respective bisecting longitudinal axis which is not illustrated. Follower ends 24 include a follower pivot orifice 28, a follower first stop orifice 30 and a follower second stop orifice 32.

In an analogous manner, control ends 26 also have three orifices contributing to the operation of chain 12. First arcuate control slot 34 and second arcuate control slot 36 are located about control pivot orifice 38 at their center of curvature.

Median follower orifices 40 and median control orifices 42 allow the connection of various components and accessories to each link, such as bridge conductor supports for supporting the flexible conductors not illustrated in the drawing.

Lubricating member 22 is a circular nylon MOS2 disk having a diameter very close to that of the semi circular link ends 24, 26. Each lubricating member 22 includes three lubricating orifices 44 alignable with the follower orifices 28, 30 and 32 which form a line substantially perpendicular to the longitudinal axis of the follower.

Connecting first pin 46, connecting second pin 48 and connecting third pin 50 extend through adjacent follower end 24, lubricating member 22 and control end 26. Connecting first pin 46 extends through follower first stop orifice 30, lubricating orifice 44, first arcuate control slot 34 and is secured by planar toothed fastener 52. Similarly third pin 50 extends through follower second stop orifice 32 lubricating orifice 44 and second arcuate control slot 36 and is fastened by planar toothed fastener 52 also. Analogously, connecting second pin 48 extends through follower pivot orifice 28 lubricating orifice 44 and control pivot orifice 38 and is fastened by planar toothed fastener 52. Of course, planar toothed fastener 52 has three toothed orifices 54, each receiving one of the connecting pins 46, 48 and 50.

Figure 4:
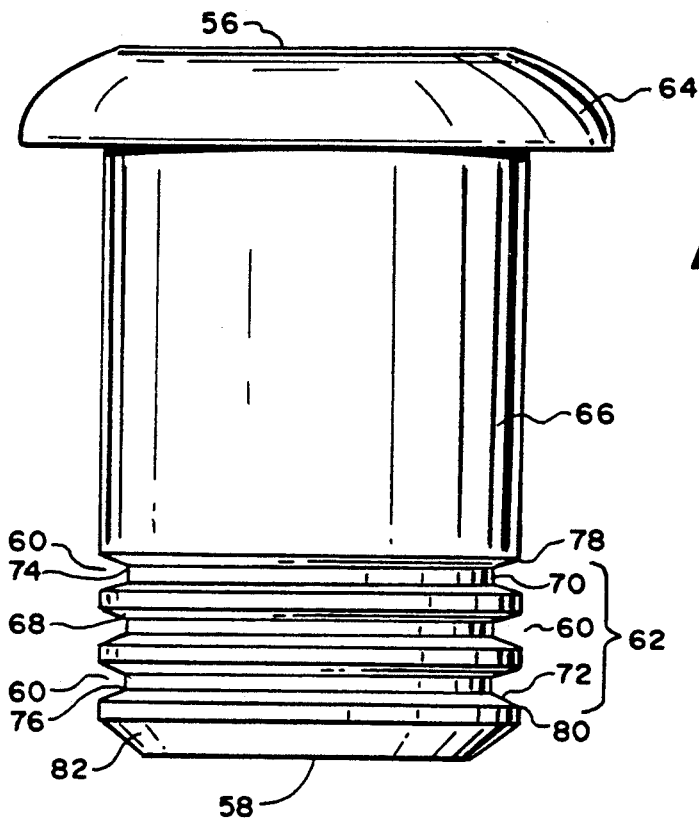
FIG. 4 is a side elevation of a connecting pin of the present invention.

Connecting pins 46, 48 and 50 are substantially identical except in function and are illustrated in FIG. 4 of the drawings. Pins 46, 48 and 50 have a head end 56 and a distal end 58. There are a plurality of circumferential grooves 60 at predetermined intervals in a groove end portion 62 adjacent to the distal end 58. Each pin is cylindrical and has a plurality of arcuate surfaces formed as surfaces of revolution about a central cylindrical axis not illustrated. Adjacent head end 56 is head 64 which has a diameter in excess of the diameter of follower orifices 28, 30 and 32. The head diameter also exceeds the pin diameter of a pin arcuate surface 66 extending between head 64 and groove end portion 62.

Each groove 60 is defined by a head groove wall 68, a groove bottom 70 and a distal wall 72. Groove bottom 70 is a cylindrical arcuate surface having a groove diameter of lesser diameter than the cylindrical pin diameter between pin arcuate surface 66. It also is a surface of revolution about the pin cylindrical axis and extends along a length of the axis for a groove axial distance between inner groove portions 74 and 76 of the respective groove walls 68 and 72. Each groove wall 68 and 72 is inclined at outer portion 78 and 80 away from groove bottom 70. While head groove wall 68 is closer to head 64, head wall inner groove portion 74 is further from head 64 than head outer groove wall portion 78. Similarly, outer groove distal wall portion 80 is closer to distal end 58 than inner groove portion 76 of distal wall 72. Groove walls 68 and 72 advantageously form an included angle with groove bottom 70 of about 60 degrees. For ease of insertion of pins 46, 48 and 50 into the various orifices it is advantageous that pin distal end 58 be a distal surface which has a minimum diameter about the pin cylindrical axis. Additionally, a partial conical surface 82 makes a transition between distal end 58 and a portion of the pin having the cylindrical pin diameter between a groove 60 closest to distal end 58. Partial conical surface 82 advantageously forms an included angle of about 45 degrees with the cylindrical axis.

Figure 5:
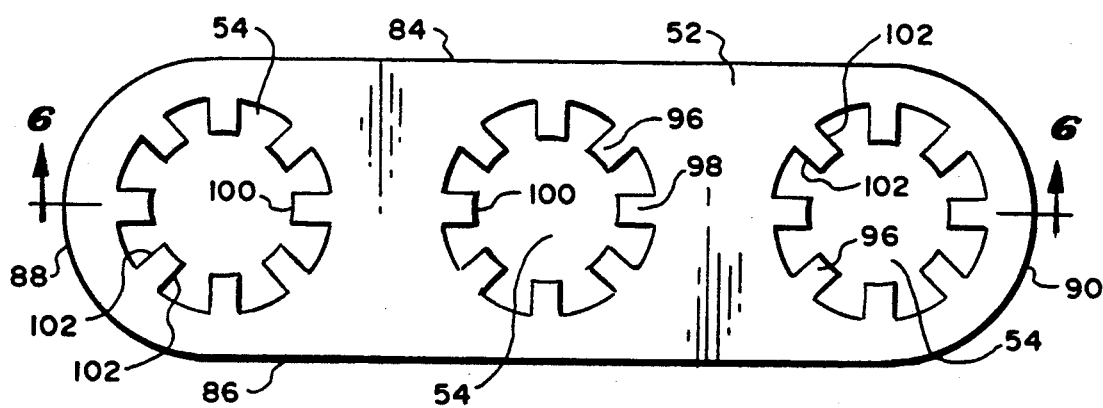
FIG. 5 is a top view of a planar toothed fastener of the present invention.
Figure 6:
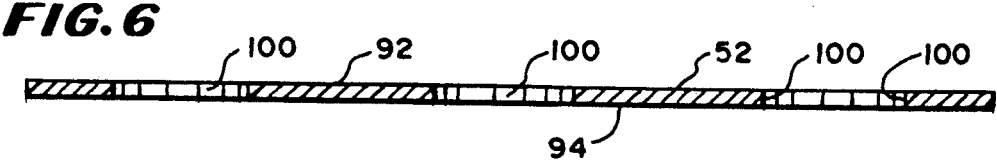
FIG. 6 is a cross section view of FIG. 5 taken along the line 6—6.

Planar tooth fastener is shown is greatest detail in FIGS. 5 and 6. Planar toothed fastener 52 is an elongate sheet having two parallel longitudinally extending side walls 84 and 86 joining arcuate end walls 88 and 90. Planar surfaces 92 and 94 are bounded by walls 84, 86, 88 and 90 and have a sheet thickness between surfaces 92 and 94. The sheet thickness is slightly greater than half the groove axial distance between groove walls 68 and 72. Each tooth orifice 54 has a plurality of basically rectangular teeth 96 extending into the orifice 54 from a tooth root 98 lying at the maximum orifice diameter to a distal arcuate end 100 defining an orifice minimum diameter. The orifice minimum diameter should be somewhat less than the groove diameter so that the arcuate ends 100 of teeth 96 form an interference fit with groove bottom 70. Tooth 96 deflection may cause tooth 96 to abut one or more groove walls 68 and 72. The arcuate segmented circle formed by arcuate ends 100 should have a common center of curvature with the respective groove bottoms 70. Each tooth 96 has a pair of parallel tooth walls 102 joining tooth root end 98 and distal arcuate end 100. Each wall 102 is parallel to a tooth center line which coincides with a radius of tooth orifice 54.

The arrangement of links shown in FIG. 3 illustrates one two to two ratio aspect of drag chain 12. As illustrated, outer follower links 18 clevis inner control links 20 with lubricating members 22 between relatively rotating inner and outer links. Chain 12 can be fabricated in a two to one ratio with two outer links clevising a single inner link or a one to one ratio.

As those skilled in the art will readily recognize, some of the elements or components described may be interchanged with others, and those shown together may be separated, and vice versa, without adversely affecting the performance of the rolling conductor support.

From the foregoing description it will be apparent that modifications can be made to the rolling conductor support of the present invention without departing from the teaching of the invention. Also, it will be appreciated that the invention has a number of advantages, some of which have been described above and other of which are inherent in the invention. Accordingly, the scope of the invention is only to be limited as necessitated by the accompanying claims.

We claim:

1. A rolling conductor support for supporting a conductor between a stationary supply and moving consumer, including a plurality of chains, each chain comprising:
   a follower link extending between follower ends along a follower longitudinal axis and defining at least two follower orifices adjacent each follower end of said follow link, said follower orifices disposed along a line which is substantially perpendicular to the longitudinal axis;
   a lubricating member having at least two lubricating orifices conformal with said follower orifices and contiguous with said follower link near said follower orifices;
   a control link extending between control ends along a control longitudinal axis and defining at least one arcuate control slot having a predetermined radius of curvature about a center of curvature, said control link contiguous with said lubricating member near said at least two lubricating orifices;
   a connecting first pin having a head end and a groove end portion adjacent a distal end, said groove end portion having a plurality of parallel circumferential grooves spaced at predetermined intervals along the cylindrical axis of said pin, said pin connecting said follower link and said control link;
   a connecting second pin having a head end and a groove end portion adjacent a distal end, said groove end portion having a plurality of parallel circumferential grooves spaced at predetermined intervals along the cylindrical axis of said pin, said pin connecting said follower link and said control link;
   at least one of said first pin and said second pin extending through one said follower orifices and said lubricating orifices, and said control slot to delimit relative rotation between said links; and
   a planar toothed fastener defining at least two toothed orifices, each accommodating said one of said connecting pins, said fastener situated in a predetermined one of said grooves on a respective pin to secure said fastener to said pin and positively position said follower link, said lubricating member, and said control link between the locating head end of said pin and said fastener.

2. The rolling conductor support of claim 1 wherein:
   said follower ends are generally semi-circular,
   said lubrication member is a Nylon disk having a diameter approximately equal to the diameter of said follower ends; and
   said control ends are generally semi-circular and approximately equal in diameter to said lubricating member.

3. The rolling conductor support of claim 2 wherein:

said at least two follower orifices includes a follower pivot orifice and a follower first stop orifice;

said control link further defines a control pivot orifice at the center of curvature of said arcuate slot; and said connecting second pin pivotally connecting said follower link to said control link by extending through said follower pivot orifice and said control pivot orifice and allowing said links to rotate about the cylindrical axis of said pin extending through said pivot orifices;

said first pin extending through said follower first stop orifice and said control slot to delimit relative rotation between said links.

4. The rolling conductor support of claim 3 wherein:

said follower link defines a follower second stop orifice, said follower second stop orifice radially displaced from said follower pivot orifice by a distance equal to the predetermined radius of said control link;

said control link at least one arcuate control slot is a first arcuate control slot and a second control slot each having the same predetermined radius of curvature about said control pivot orifice;

said fastener defines a third toothed orifice; and further including;

a connecting third pin having a head end and a groove end portion adjacent a distal end, said groove end portion having a plurality of parallel circumferential grooves spaced at predetermined intervals along the cylindrical axis of said pin, said pin connecting said follower link and said control link; said third pin extending through said second stop orifice and said second control slot to delimit relative rotation between said links.

5. The rolling conductor support of claim 4 wherein:

all said pins are cylindrical and have a cylindrical pin diameter extending between a pin arcuate surface between said head end and said groove end portion, said pin arcuate surface being a surface of revolution about said pin cylindrical axis;

said head end has a head which has a head diameter which exceeds said pin diameter and a maximum dimension of said follower orifice;

each said groove is defined by a head groove wall, a groove bottom, and a distal groove wall, said groove bottom being a cylindrical groove arcuate surface having a groove diameter of lesser diameter than said cylindrical pin diameter and being a surface of revolution about said pin cylindrical axis and extending along the length of said axis for a groove axial distance between inner groove portions of said groove walls, said groove walls having an outer groove diameter equal to a cylindrical pin diameter at an outer groove wall portion and an inner groove diameter equal to said groove diameter at said inner groove wall portion, said head groove wall extending between said outer groove wall portion and said inner groove wall portion and having said outer groove wall portion closer to said head end than said inner groove wall portion is, said distal groove wall extending between said outer groove wall portion and said inner groove wall portion and having said outer groove wall portion closer to said distal end than said inner groove wall portion is.

6. The rolling conductor support of claim 5 wherein said groove walls are at an included angle to the groove bottom of about sixty degrees.

7. The rolling conductor support of claim 1 wherein:

each said pin distal end forms a distal surface having a minimum diameter about said pin cylindrical axis; and each said pin has an partial conical surface making the transition between said minimum diameter and said cylindrical pin diamcter between said groove closest to said distal end and said distal surface.

8. The rolling conductor support of claim 7 wherein:

said partial conical surface forms an angle of about forty-five degrees with the cylindrical axis.

9. The rolling conductor support of claim 7 wherein:

said partial conical surface forms an angle of less than sixty degrees with the cylindrical axis.

10. The rolling conductor support of claim 1 wherein:

said planar toothed fastener comprises:

an elongate sheet having two parallel longitudinal extending side walls joining arcuate end walls and a sheet thickness between two large planar surfaces bounded by said walls;

each toothed orifice includes a plurality of generally rectangular teeth extending into a generally circular orifice from a tooth root end at a maximum orifice diameter to a distal arcuate end defining an orifice minimum diameter, said orifice minimum diameter being slightly less than a groove diameter defined by a portion of said groove closest to said cylindrical axis of said pin.

11. The rolling conductor support of claim 10 wherein:

said sheet thickness is about one half the distance defined by the groove diameter along the cylindrical axis;

said plurality of rectangular teeth are at least four in number and each tooth has a tooth center line coinciding with a radius of said generally circular orifice and each tooth has a pair of tooth walls, each tooth wall parallel to said tooth center line and joining said tooth root end and said distal arcuate end, said arcuate ends of said plurality of teeth forming arcuate circular segments having a center of curvature in common with a cylindrical groove bottom having said groove diameter.

* * * * *